PANORAMIC RECEIVER FOR MULTIPLEXING COMMUNICATION
SIGNALS FROM MULTIPLE SOURCES

Filed Aug. 25, 1960

INVENTOR
JIMMIE J. LOGAN

BY Raymond W. Colton
ATTORNEY

United States Patent Office 3,170,118

Patented Feb. 16, 1965

3,170,118

PANORAMIC RECEIVER FOR MULTIPLEXING COMMUNICATION SIGNALS FROM MULTIPLE SOURCES

Jimmie J. Logan, Irving, Tex., assignor, by mesne assignments, to Ling-Temco-Vought, Inc., Dallas, Tex., a corporation of Delaware

Filed Aug. 25, 1960, Ser. No. 51,986
2 Claims. (Cl. 325—333)

This invention relates to radio receivers, particularly those which intercept and render available signals from multiple sources.

Whereas receivers of the type contemplated herein have many applications, they are extremely useful in conjunction with airfield operations where it is desired to provide a complete record of communications between a tower and all aircraft with which it is in radio contact. By virtue of the present invention, a receiver capable of serving such purposes can be substantially smaller, simpler and less expensive than equipment previously available.

It is among the objects of the invention to provide: means for automatically receiving and demodulating intelligence transmitted simultaneously and/or sequentially by each of a plurality of separate transmitters operating in a radio frequency band; means whereby the demodulated intelligence can be utilized as it is received or stored on suitable recorders for playback at a future time; means for separating the intelligence received from each of a plurality of transmitters from that received from the others operating in the band; and multiple outputs, each of which will render available the demodulated intelligence received at a particular time from only one of the multiple transmitters.

Thus, the invention contemplated herein involves the application of data sampling in a receiving system to intercept multiple transmissions occurring simultaneously in an RF band. By sweeping such a panoramic receiver at a sufficiently high frequency to satisfy the sampling theorem, it is possible to recover the modulation components from a large number of transmitters operating simultaneously. The circuits here involved are applicable to linear receivers as well as to non-linear receivers whose degree of distortion can be tolerated.

The receiver contemplated by the present invention for intercepting modulated signals transmitted from multiple sources within a prescribed radio frequency band comprises a mixer having an input for the signals, a local oscillator input and an output, a local oscillator connected to the oscillator input and applying thereto a repetitive sweep frequency covering the frequency band, and a detector having an input supplied from the mixer output, the detector having an output circuit containing a load. It is of substantial importance that the oscillator has a sweep frequency at least twice the maximum modulation frequency reproduced in the output circuit. In the preferred forms of the invention, the load circuit contains a gate actuated in synchronism with the sweep frequency, and contains a number of output channels corresponding to the number of the multiple sources to be monitored, for separating pulses received from said transmitters respectively. It is also preferable that a narrow band intermediate amplifier be interposed between the mixer output and the detector input.

A more complete understanding of the invention will follow from a description based upon the accompanying drawings wherein.

Figures 1, 2, 3, 4, 5, 6, 7, 8, 9, 10, 11:
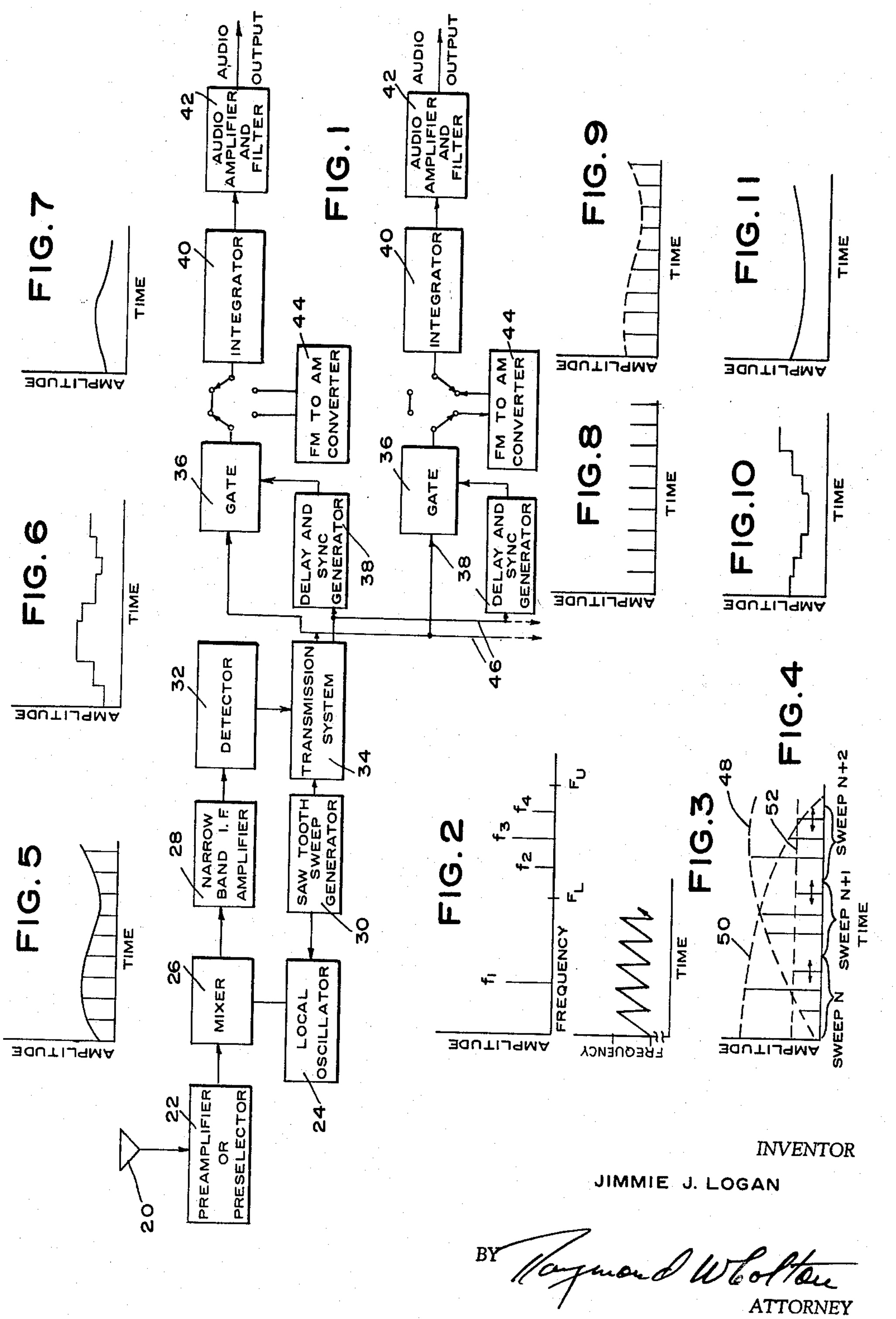
FIG. 1 is a block diagram embodying the present invention.
FIG. 2 is a graphical representation of some of the frequency-amplitude relationships occurring at the receiver antenna.
FIG. 3 is a graphical representation of the local oscillator output.
FIG. 4 is a graphical representation of the detector output.
FIG. 5 is a graphical representation of the gate output in a channel connected for amplitude modulation operating conditions.
FIG. 6 is a graphical representation of the integrator output in a channel connected for amplitude modulation operating conditions.
FIG. 7 is a graphical representation of the audio output of a channel connected for amplitude modulation operating conditions.
FIG. 8 is a graphical representation of the gate output in a channel connected for frequency modulation operating conditions.
FIG. 9 is a graphical representation of the output of an FM to AM converter in a channel connected for frefrequency modulation operating conditions.
FIG. 10 is a graphical representation of the integrator output in a channel connected for frequency modulation operating conditions.
FIG. 11 is a graphical representation of the audio output of a channel connected for frequency modulation operating conditions.

Receivers contemplated by the present invention are capable of handling signals which have been transmitted by the use of amplitude modulation, frequency modulation, phase modulation, or any combination thereof. The amplitude of each video pulse generated when the scanning receiver makes one sweep across the band, will be an analog of the instantaneous power received from the transmitter which caused the pulse to be generated.

FIG. 1 of the drawings illustrates a receiver employing superheterodyne principles which receives RF signals from an antenna 20 through an appropriate preselector or preamplifier 22, which may be either broadband or tuned in synchronism with the receiver local oscillator 24. The incoming signals and the output of the local oscillator are combined in a mixer 26. The local oscillator of this receiver is caused to sweep repetitively across a range of frequencies, as illustrated in FIG. 3, such that the receiver will time scan the RF frequency band for which the receiver is designed. A narrow band filter, typically an intermediate amplifier 28, employed in the receiver will then have an output composed of a series of pulses, essentially a time multiplex of all signals intercepted by the receiver in the course of its sweeps across the radio frequency band. According to this invention the receiver local oscillator 24 is caused to sweep, by means of a saw tooth sweep generator 30, at a frequency having a value preferably at least twice the highest modulating frequency which is to be reproduced accurately in the receiver output; for example, if it is desired to intercept and reproduce amplitude modulated voice signals, the intelligence contained therein may be determined adequately by demodulating and reproducing all frequency components up to 3000 cycles per second. To intercept such signals, the local oscillator would preferably be swept through the frequency band 6000 times per second.

The IF signals from the receiver intermediate frequency amplifier 28 are detected in a typical envelope detector 32, several forms of which are known in the art. By this means, the IF time multiplex signals are detected into video time multiplex pulses which are recurrent at the frequency at which the local oscillator is swept.

If all of the pulses occurring at a particular time from the start of each receiver sweep are separated from all other pulses in the video train, this group of separated pulses will have been generated on one receiver frequency by a transmitter operating on that frequency. Where this transmitter is amplitude modulated, the pulse samples generated may be passed through a low pass filter to recover the transmitted modulation.

Pulses generated by the technique proposed here meet the requirements of the sampling theorem. In a linear system, then, the original modulation impressed on the transmitter may be recovered exactly. If the system is non-linear, some distortion will result depending on the degree of non-linearity.

If all of the pulses occurring at approximately the same time from the start of the receiver sweep are separated out, and if the transmitter originating these pulses is frequency or phase modulated, the sweep-to-sweep position of the pulses will vary in accordance with the instantaneous frequency of the transmitter. This sweep-to-sweep jitter of pulse position may be employed as the basis for recovering the modulating frequency of the transmitter originating these pulses. Means for recovering pulse position modulation may employ the pulse train to sequentially trigger a multivibrator on a pulse-to-pulse basis. Filtering the output of this multivibrator would then permit recovery of the modulating frequencies impressed on the transmitted RF frequencies. The output of the detector 32 is essentially a pulse amplitude modulation time multiplex of all incoming signals. The pulse then can be recorded for demodulating later, or the detected intelligence may be utilized immediately. A transmission system 34 may be used to deliver the output signal to appropriate channel separation and demodulating equipment, or a recorder may be substituted at this point if the intelligence is to be employed at a subsequent time.

Since each output pulse is separate and distinct, the channels may be easily separated by using a synchronized gate and coincidence amplifier. Such a gate 36 can be synchronized by means of a signal from the same sweep generator 30 that controls the local oscillator 24.

The desired channel can be selected by delaying the gate the proper length of time, as by a delay and sync generator 38 connected to an input of the gate 36. After the pulse corresponding to a particular channel has been selected, the modulations may be fed sequentially to an integrator 40 and an audio amplifier and filter circuit 42 from which the audio output is obtained. The upper channel depicted in FIG. 1 has been shown as connected for use with an amplitude modulated signal, in which case the FM to AM converter 44 is not in circuit.

The lower channel depicts the FM to AM converter 44 as connected between the gate 36 and the integrator 44 so that frequency modulated signals will be converted to produce the desired intelligence at the channel output.

It will be understood that any number of such channels can be connected to the leads 46 to provide the desired number of output signals.

FIG. 2 illustrates the lower band limit $F_L$ of the transmitted radio frequencies intercepted, the upper band limit $F_U$, typical AM signals $f_2$ and $f_3$ within the band, a typical FM signal $f_4$ within the band and a typical signal $f_1$ lying outside of the band. The pulse amplitude envelopes of these signals lying within the selected band are represented in FIG. 4, where the envelope 48 corresponds to $f_2$, the envelope 50 corresponds to $f_3$, and the envelope 52 corresponds to $f_4$.

Whereas only one circuit has been shown and described for purposes of illustration, variations occurring to those skilled in the art are contemplated by the appended claims.

I claim:

1. In a superheterodyne receiver for receiving signals from multiple sources, comprising a mixer having an input for the signals, a local oscillator input and an output, an output detector, narrow-band intermediate-frequency circuits connected to receive signals from the output of said mixer and to supply signals to said detector, and a local oscillator, said local oscillator connected to the oscillator input of said mixer and having an input responsive to application of sweep signals to vary its output frequency, thereby to tune said receiver successively to different radio-frequency channels within a prescribed frequency band, a sweep generator having an output connected to said input of said local oscillator to apply a repetitive sweep waveform to said receiver to cause it to be tuned successively through different frequency channels repeatedly within said prescribed frequency band; a plurality of audio-frequency output channels, each of said audio-frequency output channels having an integrator and a gate, the output of said detector being connected through each of said gates to the input of the respective integrator, said gates normally being open to isolate said audio-frequency channels from said detector, each of said gates having a control circuit, a time delay circuit connected to each of said gate control circuits, means connected to said sweep generator for applying to each of said time delay circuits a pulse synchronized with the start of each of said sweep waveforms, each of said time delay circuits having a different selected time constant for applying a control pulse to a respective gate control circuit at a different predetermined time after the start of each said sweep waveform, and each of said gates connecting the output of said detector to the respective audio-frequency channel during the application of said control pulse to the gate.

2. In a receiver as claimed in claim 1 in which each of said audio-frequency channels includes circuit switching means connected to the input of the respective integrator, and a frequency-modulation to amplitude-modulation converter connected to each of said switching means, each of said switching means being operable to connect said respective converter in cascade in the respective audio-frequency channel.

References Cited by the Examiner

UNITED STATES PATENTS

| | | | |
|---|---|---|---|
| 1,951,524 | 3/34 | Nicolson | 343—204 |
| 2,092,442 | 9/37 | Colwell | 343—204 |
| 2,632,036 | 3/53 | Hurvitz | 325—311 X |
| 2,669,712 | 2/54 | Rial | 343—206 |
| 2,882,395 | 4/59 | White | 325—332 |
| 2,885,543 | 5/59 | Williams | 325—17 |
| 2,912,506 | 11/59 | Hughes | 179—15 |
| 2,954,465 | 9/60 | White | 325—333 |
| 3,019,389 | 1/62 | Ross et al. | 325—363 |

DAVID G. REDINBAUGH, *Primary Examiner.*

SAMUEL B. PRITCHARD, ROY LAKE, *Examiners.*